US009272335B2

(12) United States Patent
Ramesh

(10) Patent No.: US 9,272,335 B2
(45) Date of Patent: Mar. 1, 2016

(54) IDEXABLE DRILL INSERT

(75) Inventor: Karthic Ramesh, Bangalore (IN)

(73) Assignee: KENNAMETAL INDIA LIMITED, Bangalore (IN)

(*) Notice: Subject to any disclaimer, the term of this patent is extended or adjusted under 35 U.S.C. 154(b) by 684 days.

(21) Appl. No.: 13/552,964

(22) Filed: Jul. 19, 2012

(65) Prior Publication Data
US 2013/0022422 A1 Jan. 24, 2013

(30) Foreign Application Priority Data
Jul. 22, 2011 (IN) .......................... 2515/CHE/2011

(51) Int. Cl.
*B23B 27/16* (2006.01)
*B23B 27/14* (2006.01)
*B23B 51/04* (2006.01)

(52) U.S. Cl.
CPC ............. *B23B 27/145* (2013.01); *B23B 51/048* (2013.01); *B23B 2200/0471* (2013.01); *B23B 2200/125* (2013.01); *B23B 2200/204* (2013.01); *B23B 2251/50* (2013.01); *Y10T 407/23* (2015.01); *Y10T 408/892* (2015.01)

(58) Field of Classification Search
CPC .................... B23B 2251/50; B23B 2251/505; B23B 51/048
USPC ......... 408/187, 188, 223, 224, 231, 233, 713; 3/187, 188, 223, 224, 231, 233, 713
See application file for complete search history.

(56) References Cited

U.S. PATENT DOCUMENTS

| 3,497,933 A | 3/1970 | Okada |
| 4,072,438 A | 2/1978 | Powers |
| 4,087,917 A | 5/1978 | Sheerer |
| 4,115,024 A | 9/1978 | Sussmuth |
| 4,131,383 A | 12/1978 | Powers |
| 4,189,265 A | 2/1980 | Arnold et al. |

(Continued)

FOREIGN PATENT DOCUMENTS

| DE | 102006044605 A1 | 3/2008 |
| EP | 1813368 A2 | 8/2007 |

(Continued)

OTHER PUBLICATIONS

Sep. 26, 2013—corresponding matter office action.
(Continued)

*Primary Examiner* — Sunil K Singh
*Assistant Examiner* — Alan Snyder
(74) *Attorney, Agent, or Firm* — Larry R. Meenan

(57) ABSTRACT

A quadrangular indexable drill insert includes a substantially flat top and bottom surfaces, a side surface adjoining the top and bottom surfaces, four identical cutting edges of the side surface intersecting the top surface, a through hole extending between the top and bottom surfaces, and a chamfer provided at the bottom edge of the drill insert. Each cutting edge includes a first part edge; a second part edge extending from the first part edge; a third part edge extending away from the central axis, the second and third part edges being joined together by a transition part edge having a concave curved portion and a convex curved portion; and a curved nose portion of predetermined radius disposed at a corner of the insert adjoining the first part edge of one cutting edge with the third part edge of a succeeding cutting edge of the four identical cutting edges.

13 Claims, 6 Drawing Sheets

(56) References Cited

U.S. PATENT DOCUMENTS

| | | | |
|---|---|---|---|
| 4,194,862 A | 3/1980 | Zweekly | |
| 4,475,851 A | 10/1984 | Hale | |
| 4,507,024 A | 3/1985 | Stashko | |
| 4,606,679 A | 8/1986 | Jeremias | |
| 4,648,760 A | 3/1987 | Karlsson et al. | |
| 4,889,455 A | 12/1989 | Karlsson et al. | |
| 4,915,548 A | 4/1990 | Fouquer et al. | |
| 4,966,500 A | 10/1990 | Tsujimura et al. | |
| 5,032,049 A | 7/1991 | Hessman et al. | |
| 5,158,402 A | 10/1992 | Satran et al. | |
| 5,221,164 A | 6/1993 | Allaire | |
| 5,232,319 A | 8/1993 | Satran et al. | |
| 5,302,060 A | 4/1994 | Nystrom et al. | |
| 5,340,246 A | 8/1994 | Tukala | |
| 5,437,522 A | 8/1995 | Satran et al. | |
| 5,486,073 A | 1/1996 | Satran et al. | |
| 5,509,761 A | 4/1996 | Grossman et al. | |
| 5,593,255 A | 1/1997 | Satran et al. | |
| 5,597,271 A | 1/1997 | Men et al. | |
| 5,709,509 A | 1/1998 | Wegener et al. | |
| 5,720,583 A | 2/1998 | Bohnet et al. | |
| 5,727,919 A | 3/1998 | Heumann et al. | |
| 5,807,031 A | 9/1998 | Arai et al. | |
| 5,895,179 A | 4/1999 | Gschwend et al. | |
| 5,947,650 A | 9/1999 | Satran et al. | |
| 5,957,635 A | 9/1999 | Nuzzi et al. | |
| 5,971,672 A | 10/1999 | Hansson | |
| 5,975,812 A | 11/1999 | Friedman | |
| 6,019,553 A | 2/2000 | Yakamavich, Jr. | |
| 6,039,515 A | 3/2000 | Lamberg | |
| 6,200,077 B1 | 3/2001 | Svenningsson et al. | |
| 6,224,300 B1 | 5/2001 | Baxivanelis et al. | |
| 6,257,807 B1 | 7/2001 | Heinloth | |
| 6,336,776 B1 | 1/2002 | Noggle | |
| 6,527,486 B2 | 3/2003 | Wiman et al. | |
| 6,543,970 B1 | 4/2003 | Qvarth et al. | |
| 6,712,563 B2 | 3/2004 | Maier | |
| 6,733,212 B2 | 5/2004 | Nagaya et al. | |
| 6,783,306 B2 | 8/2004 | Popke | |
| 6,929,432 B2 | 8/2005 | Roman et al. | |
| 6,948,891 B2 | 9/2005 | Roman | |
| 7,121,772 B2 | 10/2006 | Krahula et al. | |
| 7,175,370 B2 | 2/2007 | Scherbarth | |
| 7,192,224 B2 | 3/2007 | Fritsch et al. | |
| 7,341,408 B2 | 3/2008 | Kratz | |
| 7,351,017 B2 | 4/2008 | Kruszynski et al. | |
| 7,374,372 B2 | 5/2008 | Rofner et al. | |
| 7,431,540 B2 | 10/2008 | Lof et al. | |
| 7,438,508 B2 | 10/2008 | Alm et al. | |
| 7,513,717 B2 | 4/2009 | Engstrom et al. | |
| 7,677,845 B2 | 3/2010 | Limell et al. | |
| 7,695,221 B2 | 4/2010 | Kruszynski et al. | |
| 7,758,287 B2 | 7/2010 | Alm et al. | |
| 7,837,417 B2 | 11/2010 | Blomstedt | |
| 7,857,555 B2 | 12/2010 | Wermeister | |
| 7,905,687 B2 | 3/2011 | Dufour et al. | |
| 7,909,546 B2 | 3/2011 | Nada et al. | |
| 7,922,427 B2 | 4/2011 | Spitzenberger et al. | |
| 7,972,091 B2 | 7/2011 | Svenningsson et al. | |
| 8,157,489 B2 * | 4/2012 | Wolf et al. | 408/223 |
| 8,192,113 B2 | 6/2012 | Limell et al. | |
| 8,197,163 B2 | 6/2012 | Nasu et al. | |
| 2003/0223832 A1 * | 12/2003 | Roman et al. | 408/224 |
| 2003/0223833 A1 * | 12/2003 | Roman | 408/224 |
| 2005/0111928 A1 | 5/2005 | Stanarius et al. | |
| 2007/0160433 A1 | 7/2007 | Lee et al. | |
| 2008/0131217 A1 | 6/2008 | Kruszynski et al. | |
| 2008/0226403 A1 | 9/2008 | Craig | |
| 2009/0071723 A1 | 3/2009 | Mergenthaler et al. | |
| 2009/0238649 A1 | 9/2009 | Kruszynski et al. | |
| 2009/0245949 A1 | 10/2009 | Takahashi et al. | |
| 2010/0178122 A1 | 7/2010 | Bae | |
| 2010/0209203 A1 | 8/2010 | Cao | |
| 2010/0329804 A1 | 12/2010 | Okumura | |
| 2012/0027530 A1 | 2/2012 | Agic | |
| 2014/0212235 A1 | 7/2014 | Prast et al. | |

FOREIGN PATENT DOCUMENTS

| | | | |
|---|---|---|---|
| EP | 1902799 A2 | 3/2008 | |
| JP | 59196107 A | 11/1984 | |
| JP | 10180519 A | 7/1998 | |
| JP | 2000061719 A | 2/2000 | |
| JP | 2002066811 A | 3/2002 | |
| JP | 2003094222 A | 4/2003 | |
| JP | 2009262277 A | 4/2003 | |
| JP | 2012143866 A | 8/2012 | |
| WO | 93/13899 A1 | 7/1993 | |
| WO | 03/099494 A1 | 12/2003 | |
| WO | 03/099495 A1 | 12/2003 | |
| WO | 2010126693 A1 | 11/2010 | |

OTHER PUBLICATIONS

PCT Search Report, WO.
PCT/US2014/012282: International Search Report and Written Opinion mailed Apr. 28, 2014.
Dec. 11, 2014—Non-Final_Rejection-1.
JP_2000061719_A_translation, obtained at http://dossier2.ipdl.inpit.go.jp/JP/application/P/1999-229114/13.08.1999_Description_59900785880.htm.
European Patent Office, "Extended European Search Report", for corresponding EP Application No. EP 12 817 536, Feb. 13, 2015, 7 pp.

* cited by examiner

IDEXABLE DRILL INSERT

BACKGROUND

1. Field of the Invention

Embodiments of the present disclosure relate to a drill insert, more particularly embodiments relate to a quadrangular indexible drill insert for use in a pocket of a drill body. Embodiments of the present disclosure also relate to a drill having such an insert.

2. Background Information

Drilling tools are used to drill cylindrical holes in metallic workpieces. The cutting or boring action of the drill tools may be carried out by an elongated, substantially cylindrical drilling tool, such as a combination of a tool holder and a drill insert, which is selectively attached thereto. Such an arrangement may then be used in an application wherein one end of the tool holder is securely mounted in a driving apparatus, which rotates the holder about its longitudinal axis. At the opposite end of the elongated tool holder, the cutting insert engages the material to be cut. Alternatively, the workpiece may be made to rotate relative to the holder and cutting insert, such as in positioning the holder in the tail stock of a lathe or the like. Further, the tool and workpiece may be made to rotate relative to one another. The use of replaceable cutting inserts allows for quick changing of the insert upon wear of the cutting surfaces instead of the entire tool, and allows for one tool to be used for a variety of different boring applications by simply changing the insert and not the entire drill assembly.

The indexible drill inserts plays a very important role in drilling because typically multiple sides of insert can be used for cutting one after the other. Further, use of inserts reduces the manufacturing lead time and assembling time.

The use of quadra angular indexible drill inserts are known in the art. However, the inserts which are in the art comprise four rectangular cutting edges for cutting the workpiece. The use of rectangular cutting edges tends to make the drill drift away from its center because the forces are acting all over the drill body not exactly at the center. The drill drift further creates a narrow wall which is not feasible in practical applications. Further, conventional indexible drill inserts rub the surface of the drilling hole if the diameter of the drill hole is less than the predetermined value.

In the view of above mentioned disadvantages, it is necessary to develop an improved drill insert having four identical cutting edges.

SUMMARY OF THE INVENTION

Shortcomings of the prior art are overcome and additional advantages are provided through the provision of a drill insert in accordance with aspects of the present disclosure.

Additional features and advantages are realized through the techniques of the present disclosure. Other embodiments and aspects of the disclosure are described in detail herein and are considered a part of the claimed disclosure.

The present disclosure provides a quadrangular indexible drill insert comprising: a substantially flat top surface and bottom surface, a side surface adjoining the top and bottom surfaces from four sides of the drill insert, the bottom surface being smaller than the top surface to provide positive cutting geometry. Four identical cutting edges of the side surface intersect the top surface, each cutting edge comprising: a first part edge oriented inwardly towards the axis of the drill body; a second part edge extending from the first part edge and being tangential to an imaginary inscribed circle about the insert axis; a third part edge extending away from the insert axis, the second and the third part edges are joined together by a transition part edge, making a concave curve with the second part edge and a convex curve with the third part edge; and a curved nose portion of predetermined radius at four corners of the insert adjoining first part edge of one cutting edge with third part edge of succeeding cutting edge. The drill insert also includes a through hole at the center of the drill insert extending between the top surface and the bottom surface of the drill insert for mounting the insert with the drill body and a chamfer provided at the bottom edge of the drill insert.

In one embodiment of the present disclosure, the drill insert is mounted in a peripheral pocket of the drill body.

In one embodiment of the present disclosure, the part edges are linear, and the first part edge, second part edge and third part edge are inclined at an angle ranging from about 0.5° to about 5°, about 5° to about 15° and 0° respectively with respect to horizontal axis (B-B) of the insert.

In one embodiment of the present disclosure, the curved nose portions have radius ranging from about 0.4 mm to about 1.2 mm.

In one embodiment of the present disclosure, the through hole comprises a mouth portion and series of stepped portions for accommodating an insert screw.

In one embodiment of the present disclosure, the angle of the chamfer depends on the thickness of the drill insert and preferably about 30° with respect to a vertical axis of the drill insert.

In one embodiment of the present disclosure, the top surface is provided with a protruded portion around the mouth portion.

In one embodiment of the present disclosure, corners of the edge surface of the insert make an angle ranging from about 0° to about 11° with respect to a vertical axis of the drill insert to facilitate clearance between the insert and the pocket.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING FIGURES

Novel features and characteristics of the disclosure are set forth in the appended claims. The disclosure itself, however, as well as an example mode of use, further objectives and advantages thereof will best be understood by reference to the following detailed description of an illustrative embodiment when read in conjunction with the accompanying figures. One or more embodiments are now described, by way of example only, with reference to the accompanying figures wherein like reference numerals represent like elements and in which:

The figures depict embodiments of the disclosure for purposes of illustration only. One skilled in the art will readily recognize from the following description that alternative embodiments of the structures and methods illustrated herein may be employed without departing from the principles of the disclosure described herein.

DESCRIPTION OF PREFERRED EMBODIMENTS

The foregoing has broadly outlined the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures for carrying out the same purposes of the present disclosure. It should also be realized by those skilled in the art that such equivalent constructions do not depart from the spirit and scope of the disclosure as set forth in the appended claims. The novel features which are believed to be characteristic of the disclosure, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

To overcome the drawbacks mentioned in the background, a quadra angular indexible drill insert is developed. An example embodiment of a drill insert of the present disclosure consists of four identical cutting edges having a plurality of part edges which direct the forces to the center of the drill body, which helps to prevent drifting of the drill body from its center during drilling operation.

Figure 1:
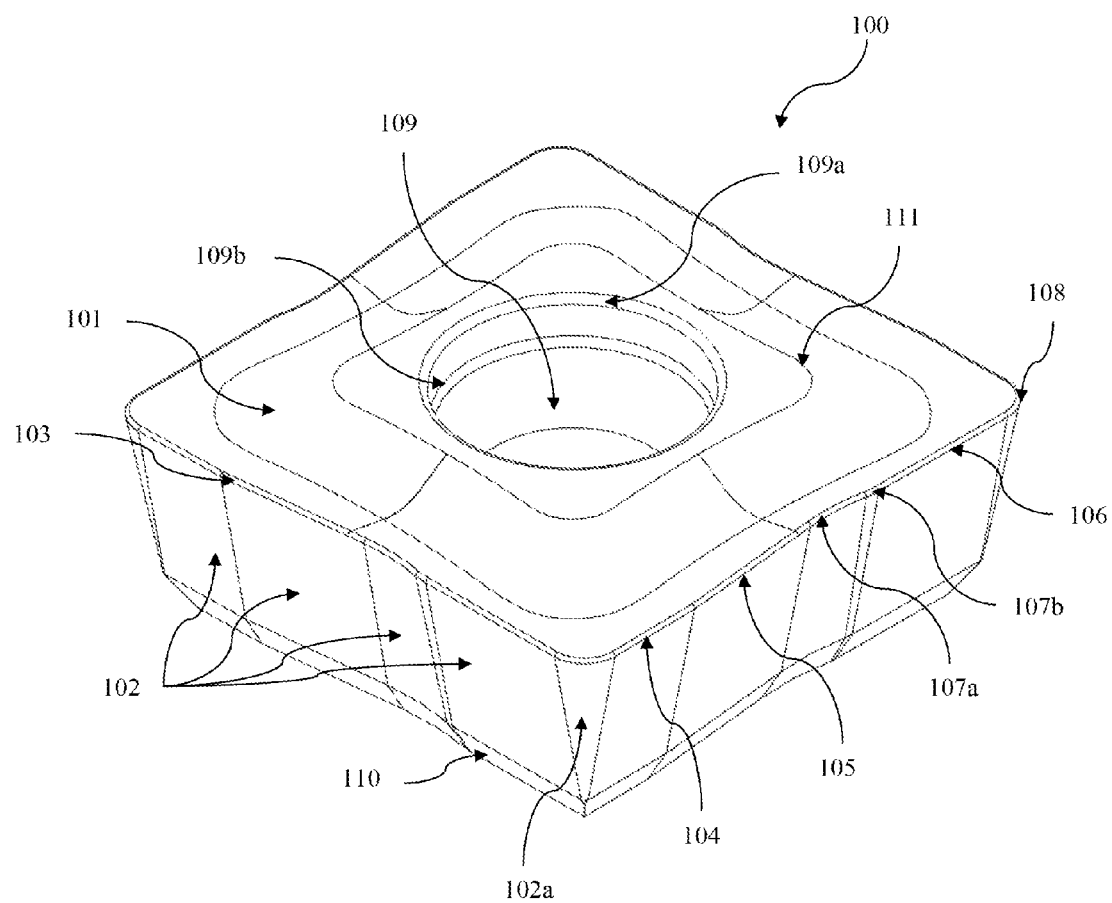
FIG. 1 illustrates an isometric view of the top of a drill insert in accordance with an embodiment of the present disclosure.
Figure 2:
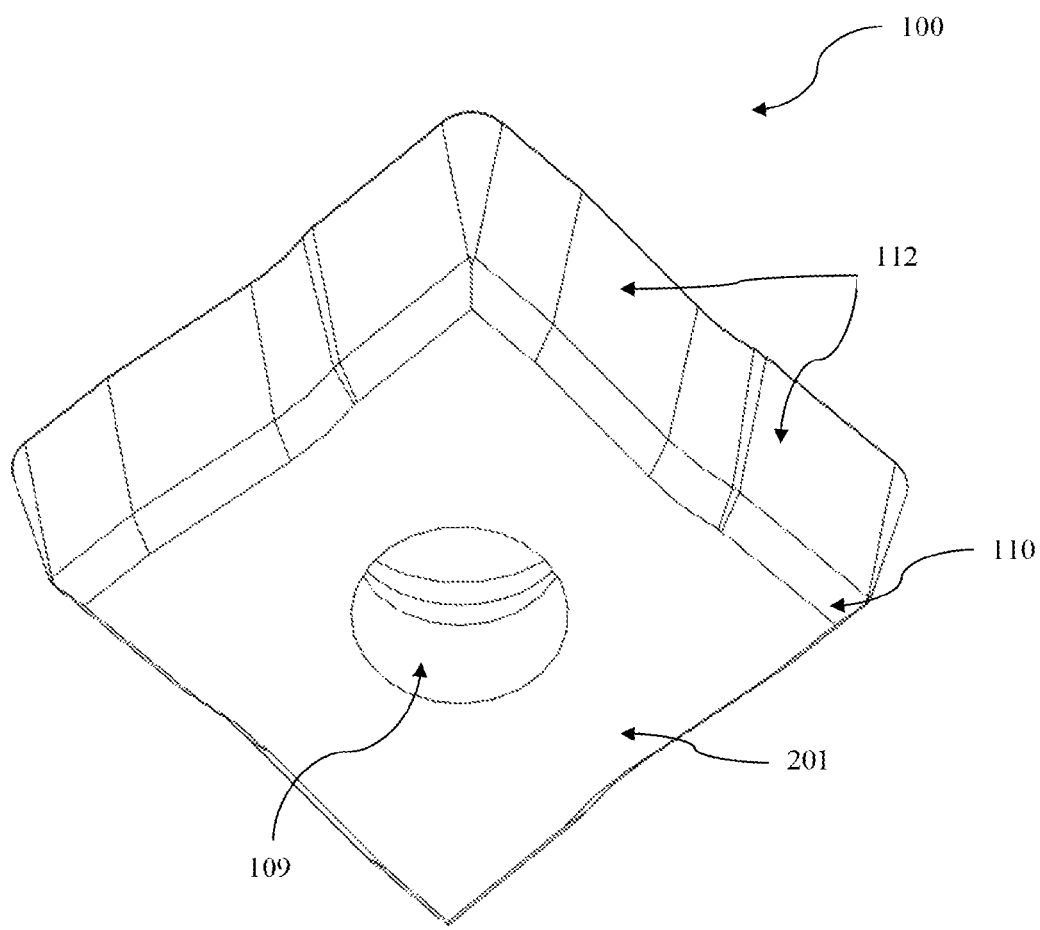
FIG. 2 illustrates an isometric view of the bottom of the drill insert of FIG. 1.
Figure 5:
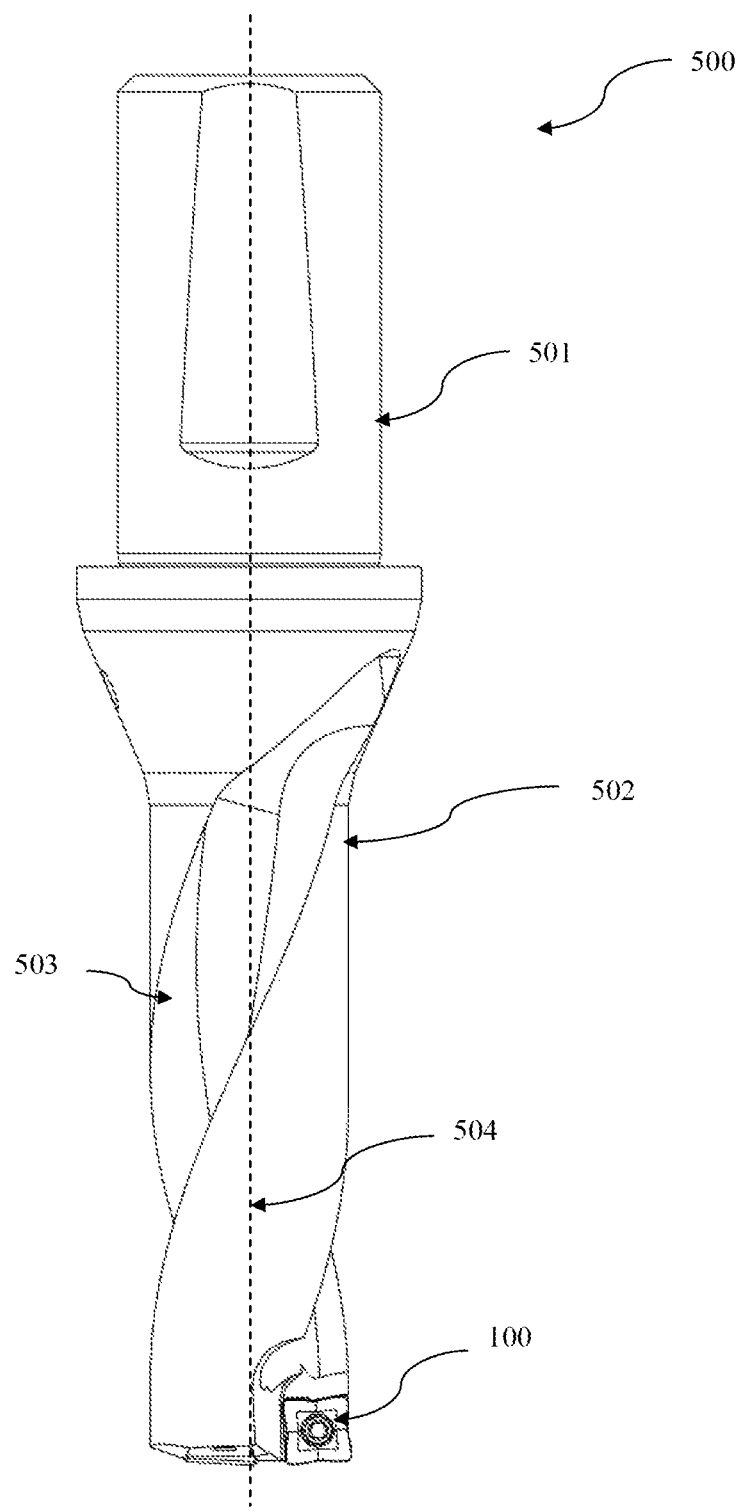
FIG. 5 illustrates a drill body in accordance with an embodiment of the present disclosure having the drill insert of FIG. 1 disposed in a peripheral pocket and a conventional insert in a center pocket.

FIGS. 1 and 2 are exemplary embodiments illustrating top and bottom isometric views of the drill insert 100. The drill insert 100 comprises a top surface 101 and a bottom surface 201 and side surface 102 adjoining the top and bottom surfaces 101 and 201. The top surface 101 of the drill insert 101 is bigger than the bottom surface 201 to provide positive clearance between the drill insert 100 and a pocket 602 (FIG. 6) in a drill body 502 (FIG. 5). The edges 103 of the top surface 101 are divided into plurality of part edges 104, 105 and 107 to direct the forces to the drilling axis 504 (FIG. 5) to prevent drifting of the drill body 502 from its center. The first part edges 104 are oriented inwardly towards a drill axis 504 and make an angle in the range of from about 0.5° to about 1.5° with respect to horizontal axis B-B of the drill insert 100. In an example embodiment the angle is about 1°. The second part edges 105 start from the end of the first part edges 104 and make an angle ranging from about 5° to about 15° with respect to horizontal axis B-B of the drill insert 100. In an example embodiment, the second part edges make an angle of about 6°.

Figure 3:
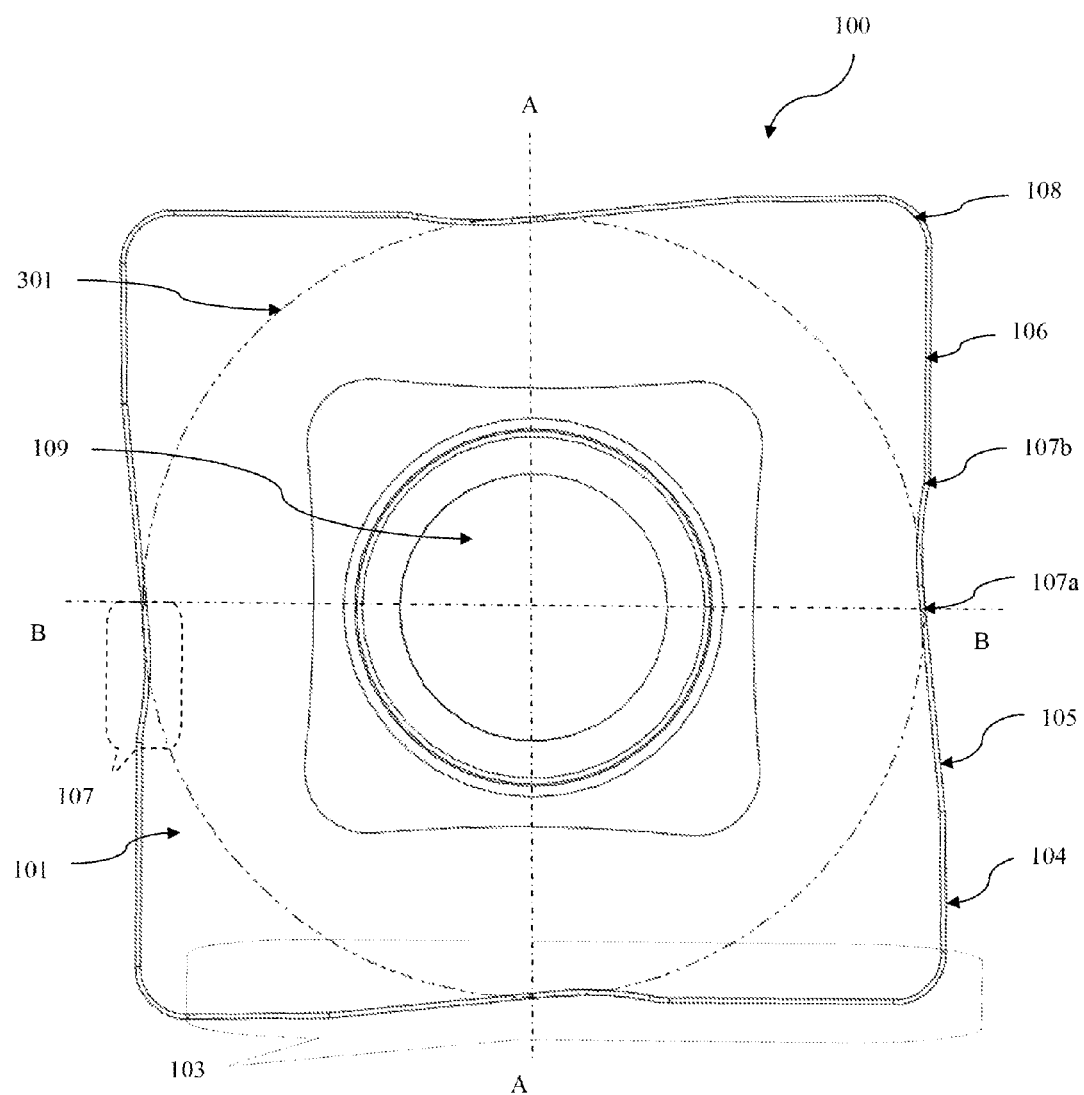
FIG. 3 illustrates a top view of the drill insert of FIG. 1.

As shown in FIG. 3, the second part edges 105 are tangential to the inscribed circle diameter 301 of the drill insert 100. The third part edges 106 are connected to the second part edges 105 via transition edges 107. The third part edges 106 are linear and extend away from the center of the insert axis.

The transition edge 107 is a spline and makes a concave curve 107a with the second part edge 105 and a convex curve 107b with the third part edge 106. Further, a corner 108 of the edge 103 has a radius and thus forms a curved nose portion, and is connected to the third part edge 106 of the one edge 103 and to the first part edge 104 of the subsequent edge 103. The corner radius depends on the thickness of the insert and the diameter of the inscribed circle 301. The corner radius is in the range of from about 0.4 mm to about 1.2 mm.

In one embodiment of the present disclosure, the first part edges 104 and second part edges 105 are oriented inwardly towards the inscribed circle 301 at an angle with slope being positive.

Figure 6:
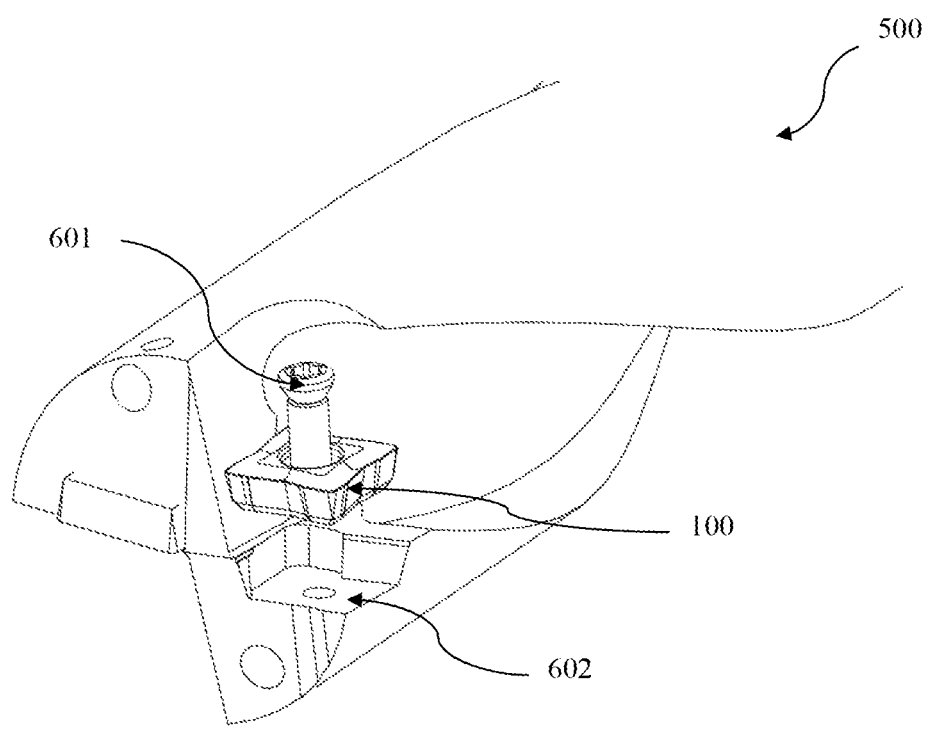
FIG. 6 illustrates a partially exploded isometric view of the end of the drill body of FIG. 5 showing the insert of FIG. 1 exploded from the peripheral pocket of the drill body.

The drill insert 100 further includes a hole 109 extending from top surface 101 to the bottom surface 201 of the drill insert 100 for mounting the insert 100 with the drill body 502. A mouth portion 109a is provided around the hole on the top surface 101 and a series of stepped portions 109b provided on the circumference of the hole 109 to accommodate the insert screw 601 for mounting the drill insert 100 in the pocket 602 of the drill body 502, as shown in FIGS. 5 and 6.

Figure 4:
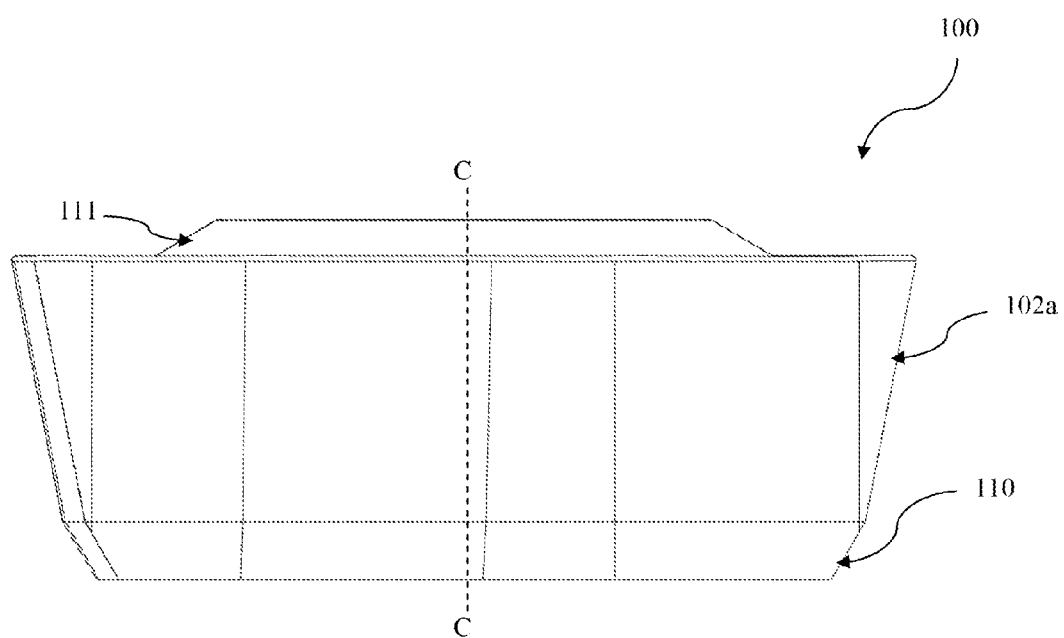
FIG. 4 illustrates a side view of the drill insert of FIG. 1.

In one embodiment of the present disclosure, a protruded portion 111 is provided on the top surface 101 of the drill insert 100, such as shown in FIG. 4. The protruded portion 111 facilitates cutting of the chip coming out of the drilling operation and directs the chip to the helical flute portion 503 of the drill body 502 to facilitate chip evacuation.

The side surfaces 102 of the drill insert 100 include a plurality of protruded portions 112 to secure the drill insert inside the pocket 602 of the drill body. The protruded portions 112 make contact with the walls of the pocket 602 and arrest the rotational motion of the drill insert 100 inside the pocket 602. Further, corners 102a of the side surface 102 make an angle of about 11° with respect to vertical axis (A-A) of the drill insert 100 to facilitate clearance between insert 100 and the pocket 602. This clearance is a primary clearance and helps to remove the insert 100 easily from the pocket 602 of the drill body.

FIGS. 3 and 4 illustrate top and side views of the drilling insert 100. The division of cutting edges into a plurality of part edges 104, 105 and 106 is clearly illustrated in the top view of FIG. 3. The part edges 104, 105 and 106 with a transition edge 107 direct the forces toward the center of the drill body 502 or axis 504 of drilling, which prevents the drifting of the drill from its center. The part edges 104, 105 and 106 and transition edge 107 are bound to vary in their sizes or lengths as the inscribed circle diameter 301 increases to accommodate various sizes of the inserts and hence vary proportionately as the size increases. In one embodiment, the first part edge 104, and the second part edge 105 together form a length in the range of from about 30% to about 60% of the total length of the cutting edge 103. In an embodiment the length of third part edge 106 is in the range of from about 30% to about 60% of the total length of the cutting edge 103.

Further, a chamfer 110 is provided at the bottom edges of the drilling insert 100 towards the bottom portion 201 as shown in FIG. 4 to facilitate the secondary clearance in the insert 100. The angle of the chamfer 110 is about 30° with respect to a vertical axis C-C of the drill insert 100 and the angle will vary with the variation in the thickness of the drill insert 100. The chamfer 110 prevents digging of the pocket 602 of the drill body 502 which in turn eliminates the wear of the pocket 602 when the drill insert 100 is in operation. The chamfer 110 also eliminates the rubbing of surface of the drill hole by the drill insert 100 when the diameter of the drill hole is less than the predetermined limit.

In one embodiment, the drill insert 100 is used in the peripheral pocket 602 of the drill body 502. In such application, the corner portions 108 of the cutting edges 103 enlarge the hole which is produced by the insert in the inner pocket 602 of the drill body 502.

FIG. 5 is an exemplary embodiment which illustrates the drill body having the drill insert of the present disclosure in its peripheral pocket 602 and a conventional insert in its center pocket. The drill tool 500 includes a shank 501 of predetermined length and a drill body 502 of cylindrical basic shape. The drill body 502 includes a pair of insert pockets one at its center and other at its periphery for accommodating the drill inserts. The drill body 502 also includes a helical flute 503 on its circumference for vacating the chips generated during the drilling operation. The chips generated during drilling operation are cut by the protrusion 111 of the drill insert 100 and are guided via the helical flute 503 of the drill body 502 for disposing the same. In one embodiment, an inboard insert and an outboard are positioned in the drill body 502 such that the forces generated during drilling operation are directed toward the drill axis 504, which prevents the drill body 502 from drifting from its center.

In one embodiment of the present disclosure, during drilling operation, the inboard insert initially applies moderate cutting forces, and then the outboard insert begins to cut the work piece.

FIG. 6 is an exemplary embodiment which illustrates a split view of the drill tool 500 having a drill insert 100 of the present disclosure in a peripheral pocket 602 of the drill body 502. The shape of the peripheral pocket 602 matches with the shape of the drill insert 100. Further, the peripheral pocket 602 includes a threaded hole (not numbered) for fastening the drill insert 100 with the drill body 502 using an insert screw 601. The insert screw 601 includes series of stepped portions and a threaded portion which passes through the through hole 109 of the drill insert 100 and fastens the same inside the peripheral pocket 602. Further, the drill body 502 comprises a conventional insert at its center pocket.

It is to be appreciated that the present disclosure provides a quadra angular indexible drill insert in which all four cutting edges may be used for drilling, i.e. when one edge wears out the subsequent edge can be used for cutting.

The present disclosure provides a quadra angular indexible drill insert which has four identical cutting edges which are divided into a plurality of part edges to direct the forces toward the drill axis 504, which eliminates drifting of the drill from its center.

The present disclosure provides a quadra angular indexible drill insert which has a chamfer in its bottom portion which prevents rubbing of the drilled hole by the insert.

The present disclosure provides a quadra angular indexible drill insert which has a protruded portion on its top surface to break the chip generated during the drilling process.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting.

The invention claimed is:

1. A quadrangular indexable drill insert comprising:
   a substantially flat top surface and bottom surface, a side surface adjoining the top and bottom surfaces from four sides of the drill insert, the bottom surface being smaller than the top surface to provide positive cutting geometry;
   four identical cutting edges of the side surface intersecting the top surface, each cutting edge comprising:
      a first part edge;
      a second part edge extending directly from the first part edge, the second part edge being disposed tangential to an imaginary inscribed circle disposed about a central axis of the insert;
      a third part edge extending away from the second part edge, the second and the third part edges being joined together by a transition part edge having a concave curved portion adjacent the second part edge and a convex curved portion adjacent the third part edge; and a curved nose portion of predetermined radius disposed at a corner of the insert adjoining the first part edge of one cutting edge with the third part edge of a succeeding cutting edge of the four identical cutting edges;

a through hole disposed at the center of the drill insert extending between the top surface and the bottom surface of the drill insert; and a chamfer provided at the bottom edge of the drill insert, wherein each of the first part edge, the second part edge and the third part edge are linear, wherein the first part edge is disposed at an angle in the range of from about 0.5° to about 5° with respect to a horizontal axis of the insert such that the first part edge extends inwardly and is closest to the horizontal axis about the second part edge, wherein the second part edge is disposed at an angle in the range of from about 5° to about 15° with respect to the horizontal axis such that the second part edge generally extends toward the horizontal axis when moving away from the first part edge; and wherein the third part edge is disposed generally parallel with respect to the horizontal axis.

2. The drill insert of claim 1 wherein each curved nose portion has a radius in the range of from about 0.4 mm to about 1.2 mm.

3. The drill insert of claim 1 wherein the through hole comprises a mouth portion and a stepped portion structured to accommodate an insert screw.

4. The drill insert of claim 1 wherein the chamfer is disposed at an angle of about 30° with respect to a vertical axis of the drill insert.

5. The drill insert of claim 1 wherein the top surface is provided with a protruded portion about the mouth portion.

6. The drill insert of claim 1 wherein corners of the edge surface of the insert form an angle in the range of from about 0° to about 11° with respect to a vertical axis of the drill insert.

7. A drill comprising:
a drill body having a peripheral pocket; and
a quadrangular indexable drill insert disposed in the peripheral pocket, the quadrangular indexable drill insert comprising:
a substantially flat top surface and bottom surface, a side surface adjoining the top and bottom surfaces from four sides of the drill insert, the bottom surface being smaller than the top surface to provide positive cutting geometry;
four identical cutting edges of the side surface intersecting the top surface, each cutting edge comprising:
a first part edge;
a second part edge extending from the first part edge, the second part edge being disposed tangential to an imaginary inscribed circle disposed about a central axis of the insert;
a third part edge extending away from the second part edge, the second and third part edges being joined together by a transition part edge having a concave curved portion adjacent the second part edge and a convex curved portion adjacent the third part edge; and
a curved nose portion of predetermined radius disposed at a corner of the insert adjoining the first part edge of one cutting edge with the third part edge of a succeeding cutting edge of the four identical cutting edges;

a through hole disposed at the center of the drill insert extending between the top surface and the bottom surface of the drill insert; and a chamfer provided at the bottom edge of the drill insert, wherein each of the first part edge, the second part edge and the third part edge are linear, wherein the first part edge is disposed at an angle in the range of from about 0.5° to about 5° with respect to a horizontal axis of the insert such that the first part edge extends inwardly and is closest to the horizontal axis about the second part edge;

wherein the second part edge is disposed at an angle in the range of from about 5° to about 15° with respect to the horizontal axis such that the second part edge generally extends toward the horizontal axis when moving away from the first part edge; and wherein the third part edge is disposed generally parallel with respect to the horizontal axis.

8. The drill of claim 7 wherein the drill body further comprises a central pocket having an insert different from the quadrangular indexable drill insert disposed therein.

9. The drill of claim 7 wherein each curved nose portion has radius in the range of from about 0.4 mm to about 1.2 mm.

10. The drill of claim 7 wherein the through hole comprises a mouth portion and a stepped portion structured to accommodate an insert screw.

11. The drill of claim 7 wherein the chamfer is disposed at an angle of about 30° with respect to a vertical axis of the drill insert.

12. The drill of claim 7 wherein the top surface is provided with a protruded portion about the mouth portion.

13. The drill of claim 7 wherein corners of the edge surface of the insert form an angle in the range of from about 0° to about 11° with respect to a vertical axis of the drill insert.

* * * * *